United States Patent [19]

Dobson

[11] Patent Number: 5,032,218
[45] Date of Patent: Jul. 16, 1991

[54] SULFURIC ACID REPROCESSOR

[75] Inventor: Jesse C. Dobson, Oakland, Calif.

[73] Assignee: Alameda Instruments, Inc., Pleasanton, Calif.

[21] Appl. No.: 398,074

[22] Filed: Aug. 24, 1989

Related U.S. Application Data

[63] Continuation-in-part of Ser. No. 231,849, Aug. 12, 1988, Pat. No. 4,980,032.

[51] Int. Cl.$^5$ .................. B44C 1/22; H01L 21/306; B01D 3/00
[52] U.S. Cl. ................................ 156/642; 156/345; 203/40
[58] Field of Search ............... 203/12, 40, 73, 74, 203/80, 86, DIG. 2, DIG. 16; 202/154, 159, 197, 267, 185.6; 423/531, 525, 526, 529; 134/12, 101, 103, 104.4, 108, 109, 110, 111; 159/47.3, DIG. 19, DIG. 15; 156/642, 345

[56] References Cited

U.S. PATENT DOCUMENTS 4,826,605  5/1989  Doble et al. .................... 156/642 X
4,855,023  8/1989  Clark et al. .................... 156/642 X Primary Examiner—William A. Powell
Attorney, Agent, or Firm—Blakely, Sokoloff, Taylor & Zafman

[57] ABSTRACT

An apparatus and method for reprocessing waste oxidant solution containing contaminated $H_2SO_4$ from, for example, a semiconductor processing operation to supply reprocessed ultrapure $H_2SO_4$ and ozone is described. The apparatus and method include a two distillation flasks which are maintained under a substantial vacuum. The first distillation flask includes a first column with a column packing means and a reflux means to retard loss of $H_2SO_4$ in the first distillation. The second distillation flask boils off substantially pure $H_2SO_4$ through a column which is coupled to a condenser which condenses substantially pure $H_2SO_4$. The apparatus and method further include an ozone generator and ozone addition module to saturate the substantially pure $H_2SO_4$ with ozone to provide an oxidant solution for the semiconductor processing operation. The apparatus and method further includes an ozone destruction unit which destroys the ozone in the waste oxidant solution that is removed from the semiconductor processing operation.

14 Claims, 11 Drawing Sheets

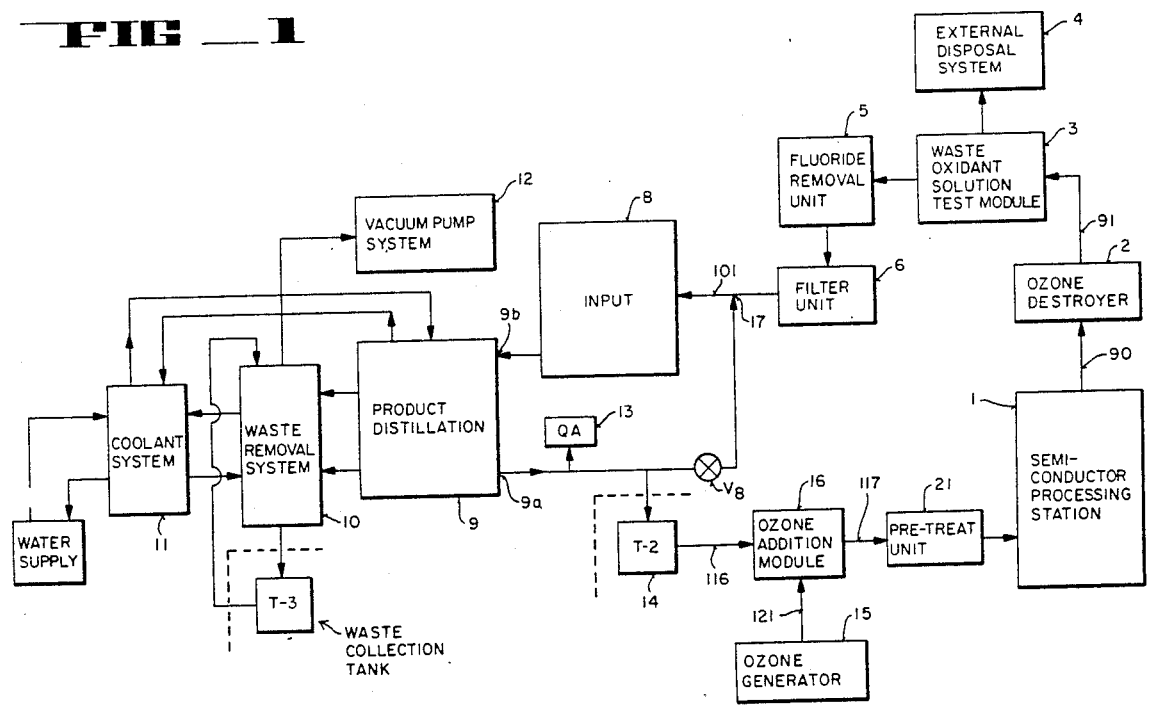
FIG _ 1

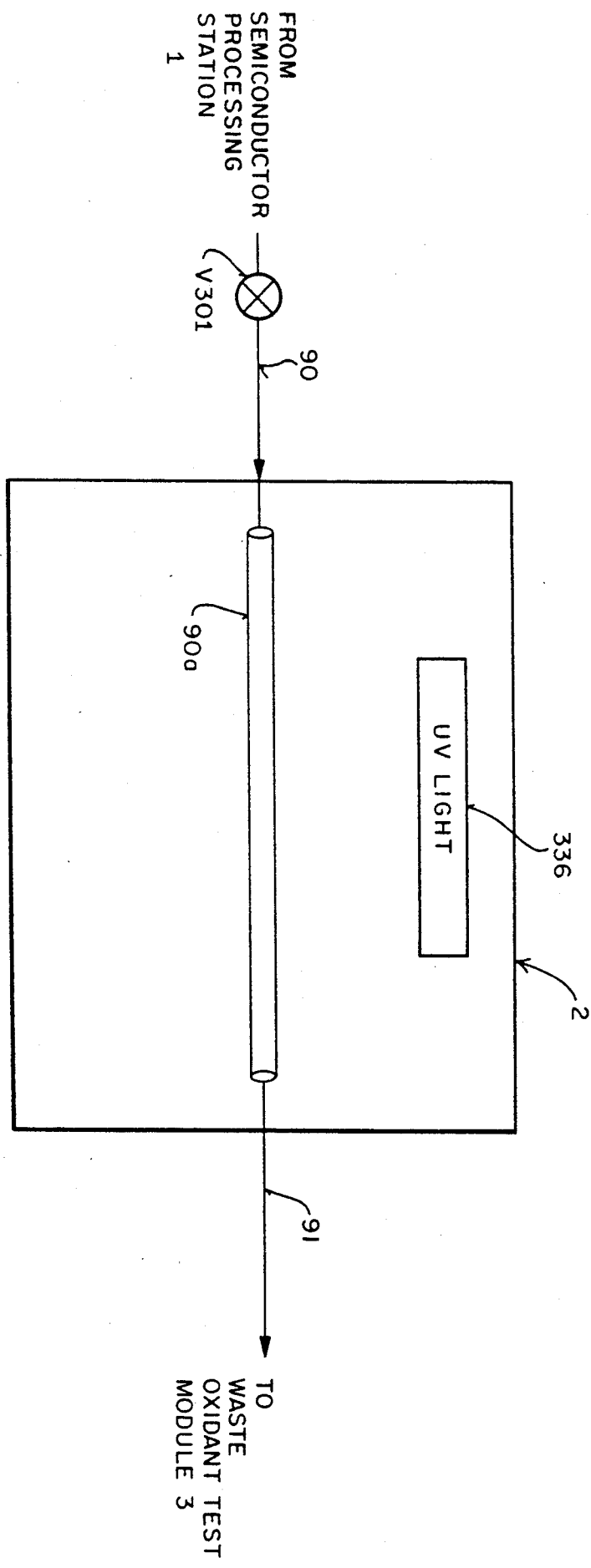
FIG.—2A

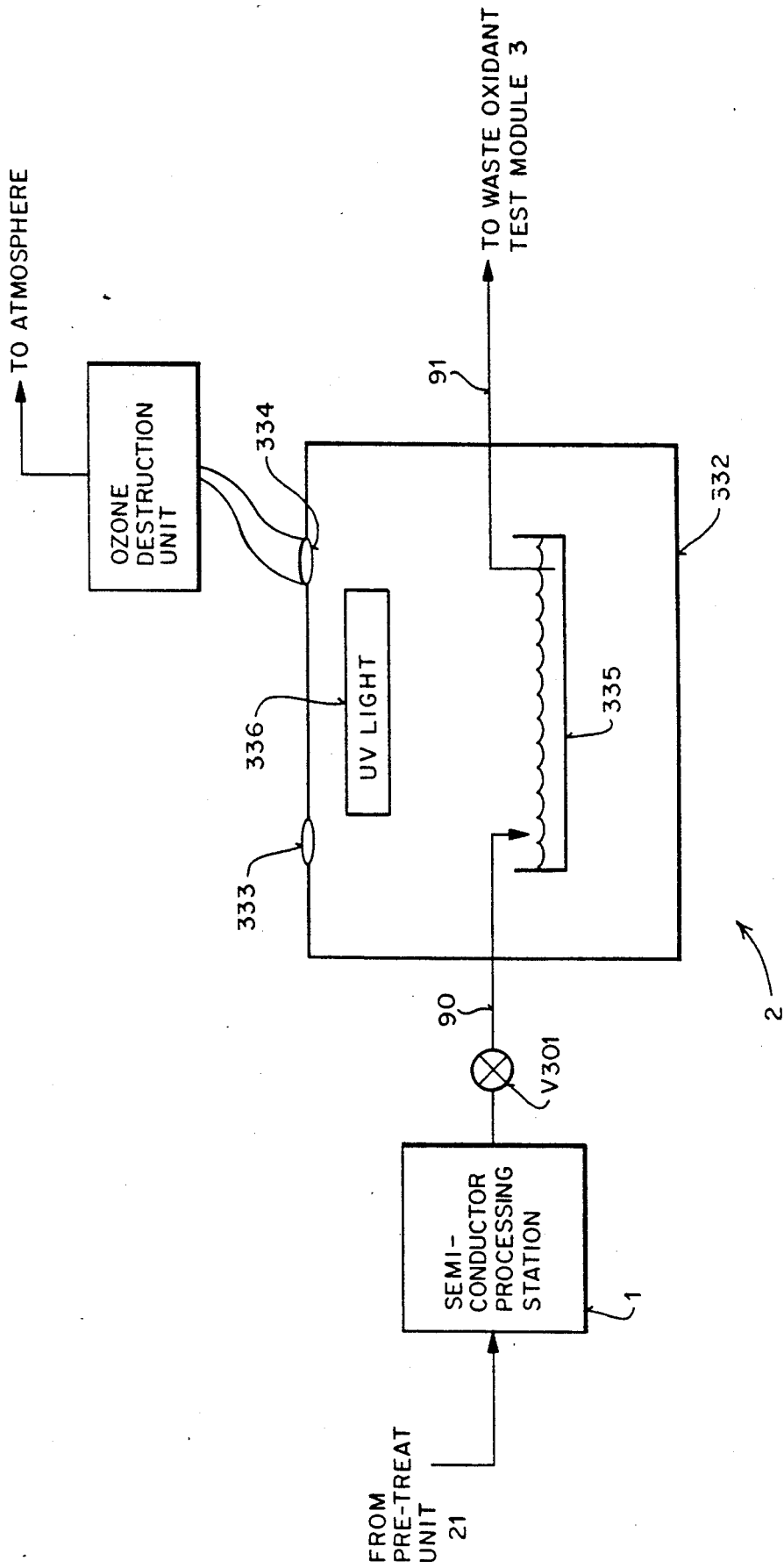

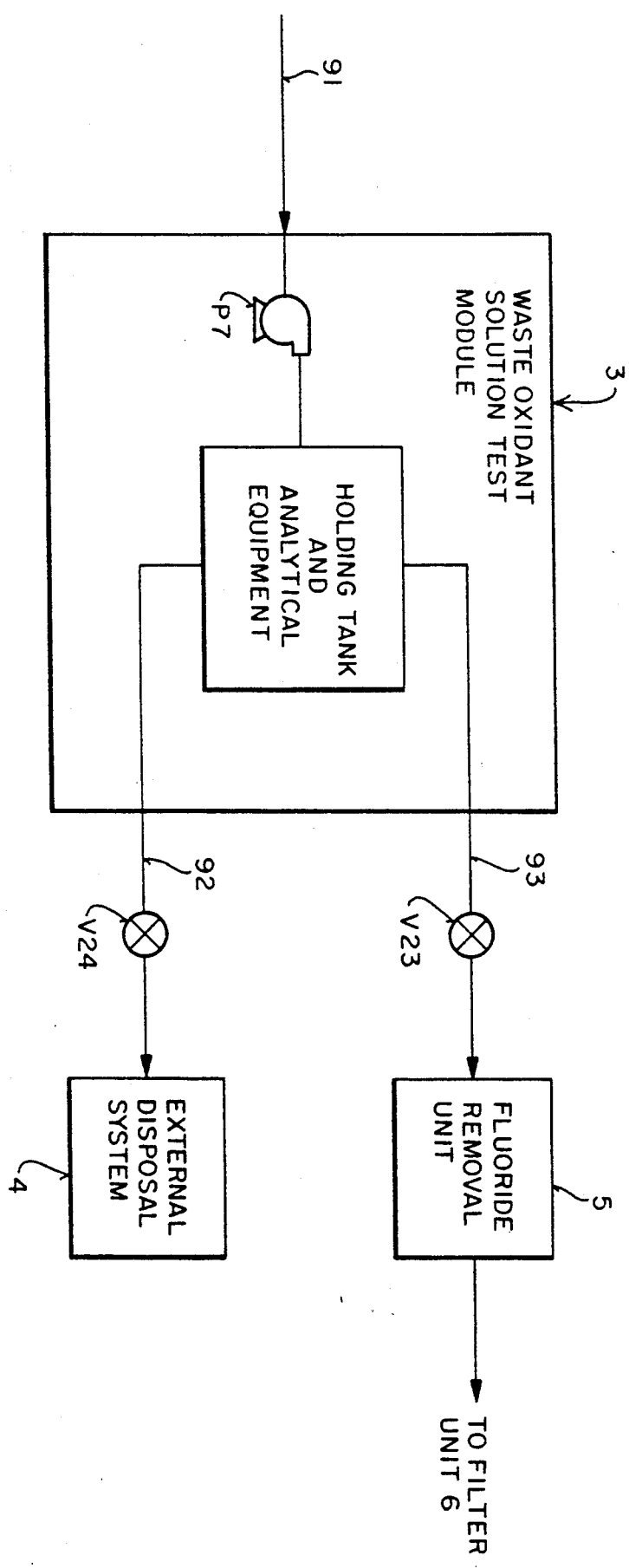
FIG—3

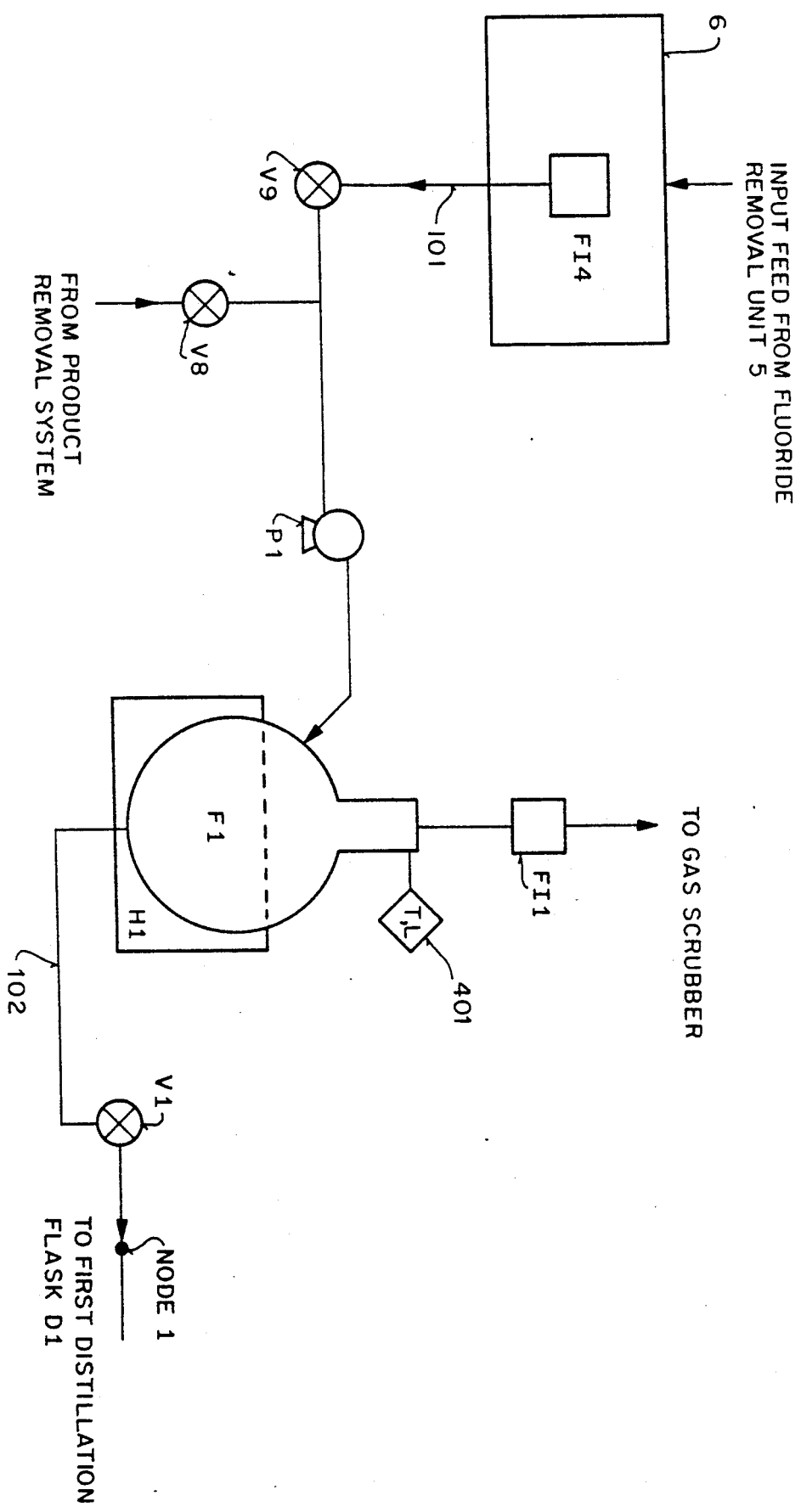
FIG—4

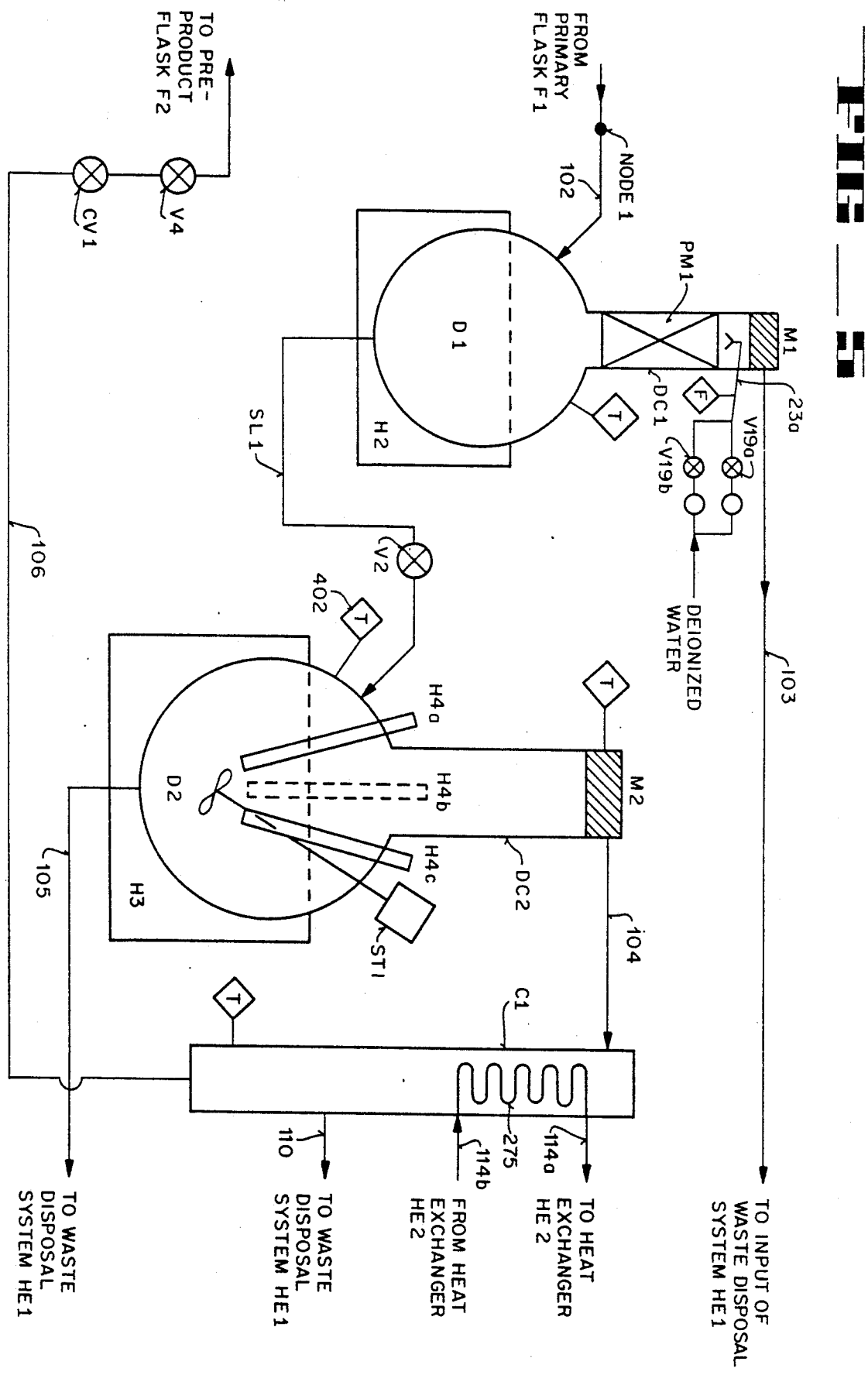

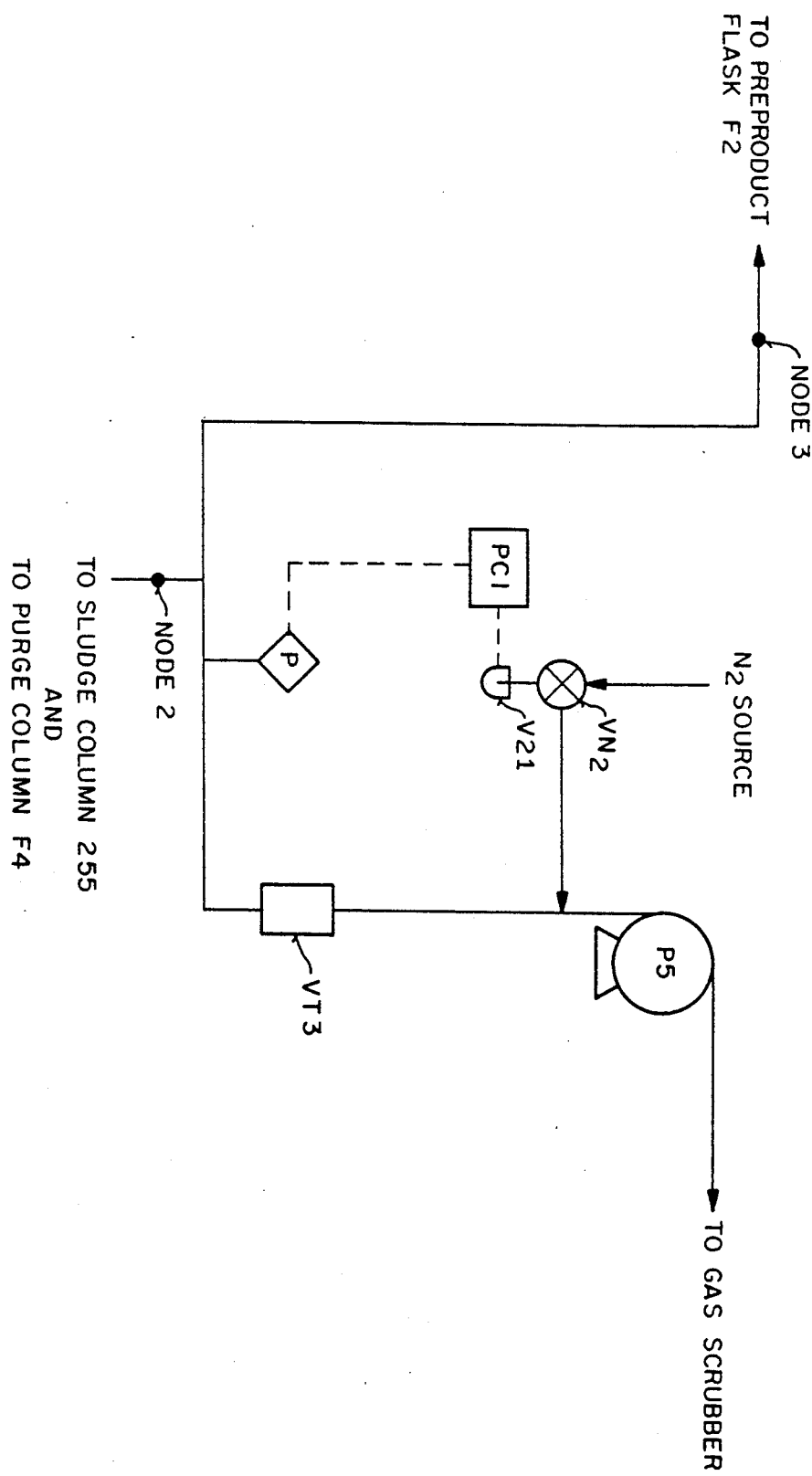
FIG-X

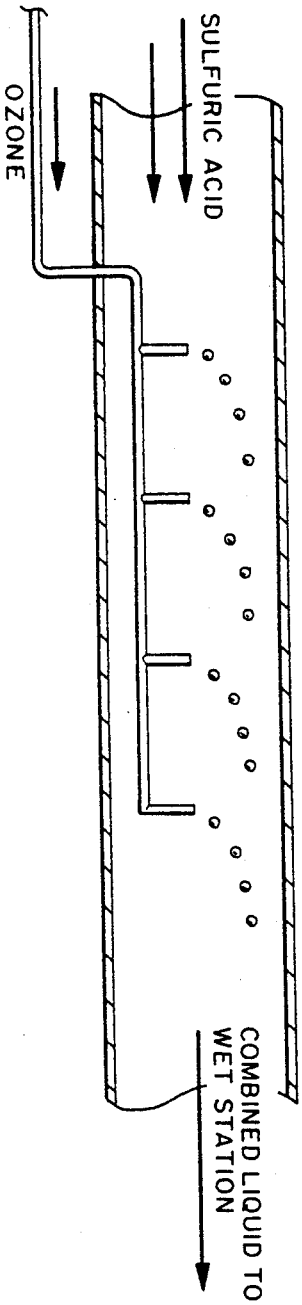
FIG — 11B ALTERNATE OZONE ADDITION MODULE
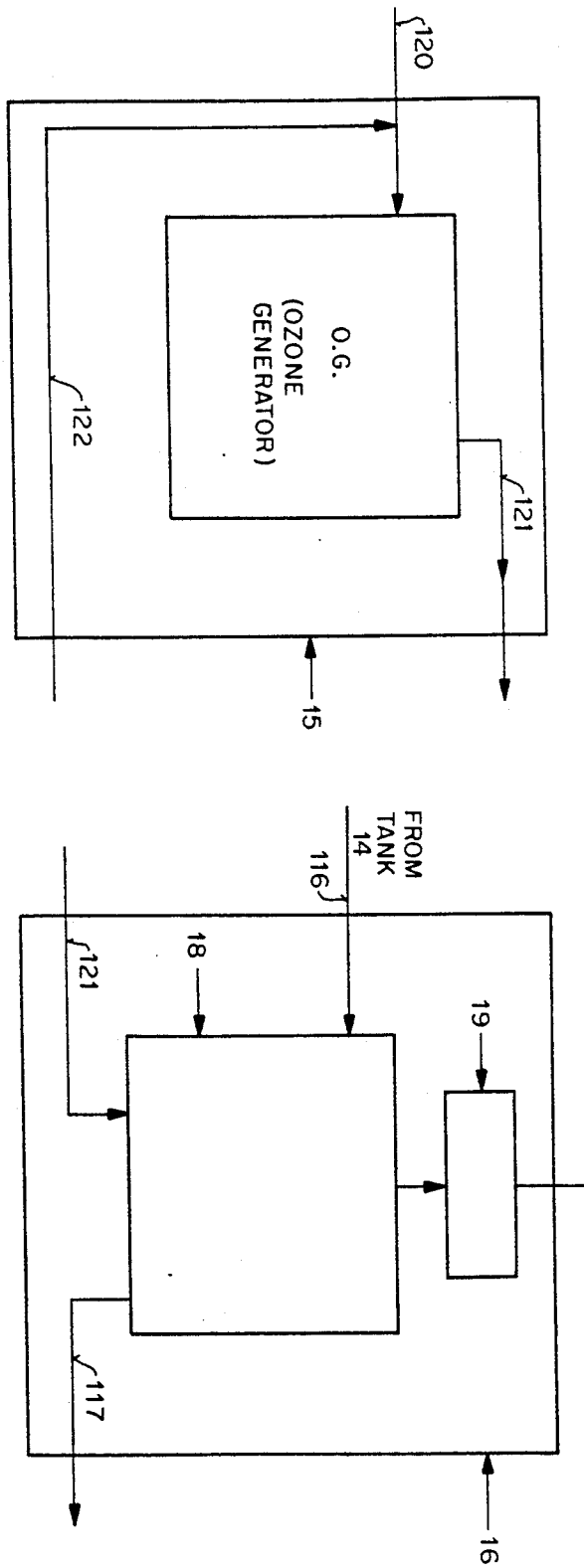
FIG — 10
FIG — 11A

SULFURIC ACID REPROCESSOR

RELATED PATENT INFORMATION

This is a continuation in part of application Ser. No. 07/231,849, filed Aug. 12, 1988, Pat. No. 4,980,032.

BACKGROUND OF THE INVENTION

1. Field of the Invention

This invention relates to reprocessing of solutions of acid and oxidants and more particularly to a double distillation reprocessing of a waste oxidant solution comprising sulfuric acid ($H_2SO_4$) and ozone ($O_3$) to obtain semiconductor grade sulfuric acid and ozone.

2. Prior Art

The semiconductor manufacturing industry uses oxidant solutions such as $H_2SO_4$ or $H_2SO_4$ in combination with an oxidant such as hydrogen peroxide ($H_2O_2$), ammonium persulfate (($NH_4)_2S_2O_8$), or peroxydisulfuric acid (PDSA) ($H_2S_2O_8$). These combinations of $H_2SO_4$ and an oxidant are often referred to as "piranha acid." In the semiconductor integrated circuit manufacturing industry, these combinations are used at a semiconductor processing station to clean wafers and strip organic material such as photoresist. The used acid ("spent acid") is usually discarded after the processing operation.

Environmental concerns, economics and improved processing yields often make reprocessing of the spent acid a compelling option. However, reprocessing such acid to a semiconductor grade standard, with very low impurities and particulates, particularly on site at a semiconductor processing station, is a difficult task requiring sophisticated equipment, such as the reprocessor disclosed in co-pending U.S. patent application Ser. No. 07/231,849, filed Aug. 12, 1988, U.S. Pat. No. 4,980,032. Another approach for a sulfuric acid reprocessor is disclosed in U.S. Pat. No. 4,828,660. An on-site reprocessor must regenerate and recycle sulfuric acid from the combination of sulfuric acid and an oxidant if the oxidant is used in the processing station. Any reprocessor for this purpose will also need to supply this oxidant.

In the solutions containing an oxidant in addition to $H_2SO_4$, the stripping or cleaning operation can be carried out at a lower temperature than when $H_2SO_4$ alone is used. The lower stripping temperature has the advantage of reducing the amount of corrosive vapors given off at the point of use, in this case at a semiconductor processing station. In addition, the oxidant removes carbon from the solution which could redeposit on the wafer by reacting with carbon to form carbon dioxide ($CO_2$).

Because of the advantages of using an oxidant solution, it is desirable for the reprocessing system to provide to the semiconductor processing station, in addition to ultrapure $H_2SO_4$, some type of oxidant. It is well known to add ultrapure PDSA to the $H_2SO_4$ in a $H_2SO_4$ reprocessing system to provide an ultrapure oxidant solution comprising $H_2SO_4$ and PDSA to the semiconductor processing station. For example, see U.S. Pat. No. 4,828,660 (wherein ultrapure PDSA is generated from an ultrapure stream of $H_2SO_4$ directly from the $H_2SO_4$ reprocessor). When adding PDSA to $H_2SO_4$, a substantial amount of water is added to the oxidant solution due to the nature of PDSA manufacture. This water in the oxidant solution places a large load on the reprocessor since the water must be removed from the waste oxidant solution.

In addition to the oxidants named above, ozone has been found to be a good oxidant for use in combination with $H_2SO_4$ for cleaning and stripping operations in semiconductor integrated circuit manufacture. See Japanese patent application publication No. 57-180132. The addition of ozone to the $H_2SO_4$ does not involve the addition of any substantial water to the solution. However, ozone does not remain soluble in sulfuric acid which is heated (even at the lower stripping temperatures which are usually used) and therefore it is difficult to maintain a sufficient zone activity in the sulfuric acid bath used in semiconductor processing stations while at the same time keeping the concentration of ozone low in the surrounding area. These problems have complicated the use of ozone as an oxidant for water cleaning and so reprocessors have not been used with ozone as an oxidant. There are several disadvantages of using ozone in an oxidant solution that is to be reclaimed in a reprocessor. It is known to attack organic compounds, and could threaten the reliability of the reprocessor by corroding any organic components if not removed prior to reprocessing. Because ozone is very chemically active, it may interfere with any analytical measurements performed by the reprocessor. In addition, ozone is known to be toxic, so its concentration must be kept at a low level in the surrounding work area.

SUMMARY OF THE PRESENT INVENTION

A double distillation reprocessor apparatus and process for reprocessing waste acid or waste oxidant solution from a semiconductor wafer or other ultrapure cleaning, stripping, or etching process and for providing an ultrapure oxidant solution comprising $H_2SO_4$ and ozone is described.

The waste oxidant solution is removed from a semiconductor processing station and is conveyed to an ozone destroyer which removes substantially all of the ozone from the waste oxidant solution, which is then processed through double distillation, thereby increasing the purity of the product $H_2SO_4$ to meet semiconductor grade standards. Further, the double distillation process maximizes the purity of the product. Reducing the pressure advantageously employs a proportional relationship between pressure and temperature. Since the boiling point of a material is reduced as the pressure is decreased, safer temperatures may be maintained. In the first distillation, a distillation flask means is operated at the boiling point of relatively dilute (typically 80-95%) $H_2SO_4$. However, to assure that $H_2SO_4$ is not lost on the distillate at this first step, dilute acid is trickled through the column of the distillation flask means thus removing gaseous $H_2SO_4$ from the distillation vapor.

Once the lower boiling compounds are removed from the distillation mixture and the acid is at the proper concentration, the mixture is transferred to a second distillation flask means. At this point, the enriched feed is heated to reach the boiling point of $H_2SO_4$, which has been reduced by decreasing the pressure to approximately 5 Torr in the second distillation flask means. Decreasing the pressure reduces the boiling point of the $H_2SO_4$. The reduction of the temperature causes the chemical activity differential between the product $H_2SO_4$ and the higher boiling metallic impurities to increase (i.e. the difference between the chemical activity of $H_2SO_4$ and the chemical activity of higher boiling metallic impurities increases), thus ensuring a purer product because of reduced level of these impurities. While the two step vacuum distillation is advantageous, atmospheric distillation are also effective.

As the gaseous $H_2SO_4$ exits the second distillation flask means, a small amount of the second distillation flask content is continuously or periodically transferred into the sludge reservoir and periodically removed from the system via a receiving tank. The $H_2SO_4$ vapor from the second distillation flask means is liquified through a condenser. A self-contained, recycled coolant system is maintained through the condenser. The reprocessing system provides for further recycling if the quality assurance system indicates that the product is not within the required specifications. In addition to the safer conditions of lower operating temperatures, the system is maintained with numerous temperature sensors and liquid level monitors which will indicate any safety threatening problems. Multiple alarms are triggered when such problems arise as well as when product readings are out of specification.

The system also includes an ozone generator. The ozone generated in the preferred embodiment is added to the purified $H_2SO_4$ before transfer to the semiconductor processing operation, thus providing an ultrapure oxidant solution. The waste oxidant solution exiting the semiconductor processing operation is treated in an ozone destroying system (e.g., a system exposing the waste solution to UV light) to destroy any remaining ozone before the waste oxidant solution is reprocessed in the reprocessor, preventing the release of additional ozone into the work area and removing the possibility of reprocessor system degradation or analytical equipment interference due to ozone.

The apparatus and method of the present invention is usually operating continuously in a loop to thereby continuously remove waste oxidant solution from the semiconductor processing station and continuously recycle the waste oxidant solution through the ozone destroyer and then the double distillation to produce a highly purified acid which is mixed with ozone to form a highly purified oxidant solution which is continuously added back to the semiconductor processing station.

The process and apparatus of the invention yields more purified $H_2SO_4$ (relative to the prior art) because the terminal velocity of the particulate contaminants are decreased by the vacuum in the second distillation stage. The ozone generation and introduction means in combination with the $H_2SO_4$ reprocessor provide an ultrapure oxidant solution ready for use at a semiconductor processing station. Moreover, the use of a vacuum in the second stage of distillation permits the reduction of the temperatures required to vaporize the $H_2SO_4$; therefore, less expensive equipment and superior seals may be utilized in the apparatus of the invention relative to prior art apparati. The lower temperatures also reduce the wear and disintegration on the equipment and, therefore, improve the reliability of the equipment.

BRIEF DESCRIPTION OF THE DRAWINGS

FIG. 1 is a block diagram of the waste oxidant solution reprocessing system.

FIG. 2a is a detailed schematic representation of the preferred ozone destroyer 2 of the present invention and FIG. 2b shows an alternative embodiment of the ozone destroyer 2.

FIG. 3 is a detailed schematic representation of the waste oxidant solution test module.

FIG. 4 is a detailed schematic representation of the preparation apparatus prior to distillation.

FIG. 6 is a detailed schematic representation of the apparatus employed for contaminated acid.

FIG. 8 is a detailed schematic representation of the vacuum pump system.

FIG. 9 is a block diagram of the product removal and quality assurance loop.

FIG. 10 is a detailed schematic representation of the ozone generator.

FIGS. 11a and 11b are detailed schematic representations of the preferred and alternative embodiments of the ozone addition module.

DETAILED DESCRIPTION OF THE PRESENT INVENTION

Figure 5:
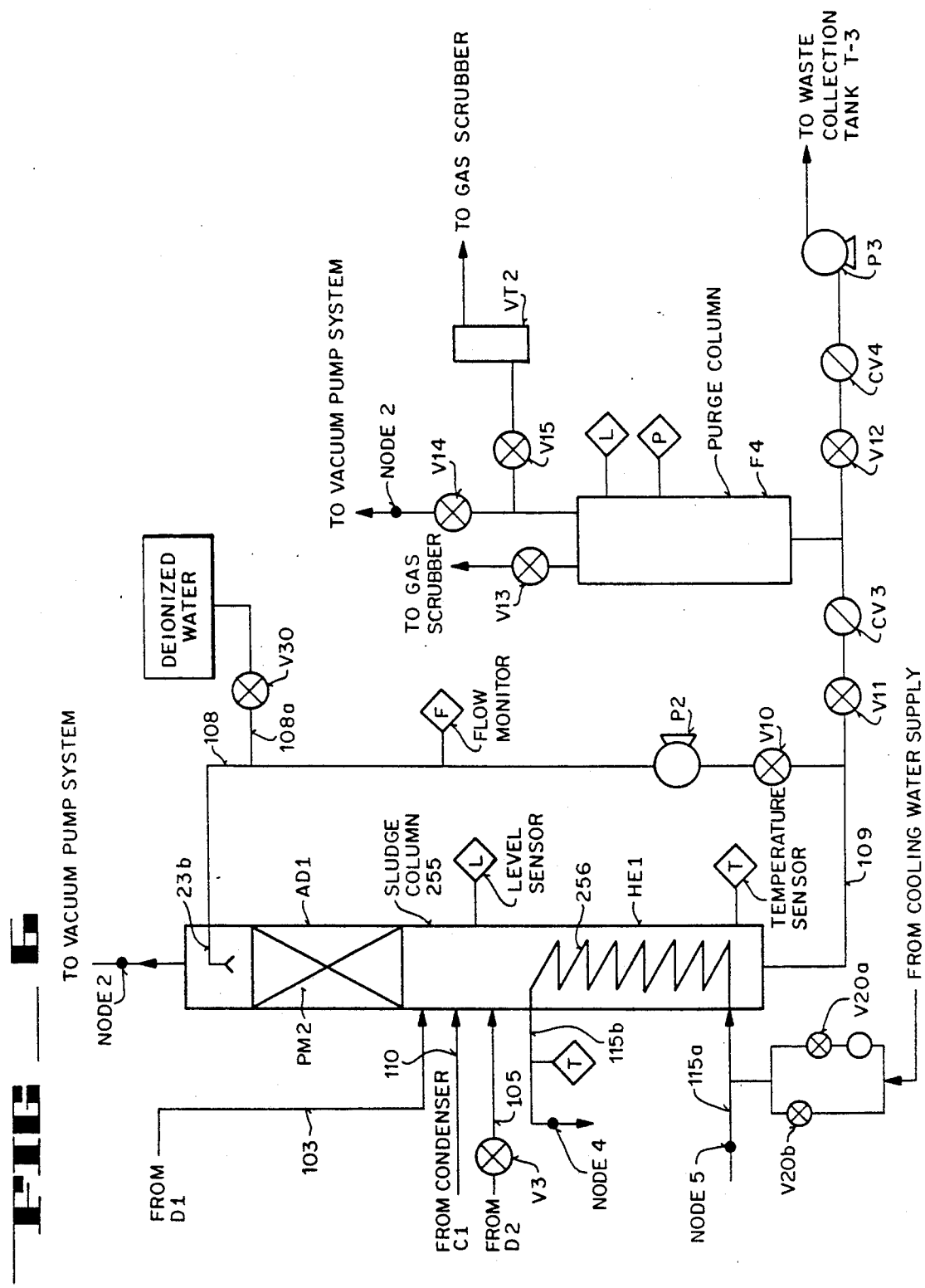
FIG. 5 is a detailed schematic representation of the double distillation apparatus.

A double distillation reprocessor apparatus and process for reprocessing waste oxidant solution from a semiconductor wafer cleaning, stripping, or etching process and for providing an ultrapure oxidant solution comprising $H_2SO_4$ and ozone is described. In the following description, numerous specific details are set forth such as specific temperatures, pressures, materials, etc., in order to provide a thorough understanding of the present invention. It will be apparent to one skilled in the art after reviewing the present description that the present invention may be practiced without these specific details. In other instances, well known techniques and devices have not been described in detail in order not to unnecessarily obscure the present invention.

In FIG. 1, a waste oxidant solution reprocessing system is schematically represented. The waste oxidant solution ("feed"), comprising waste $H_2SO_4$, ozone, water, heavy metal contaminants and particulates exits from semiconductor processing station 1. In the preferred embodiment the feed is then treated in ozone destroyer 2 to destroy any ozone remaining after processing in semiconductor processing station 1. The feed then enters waste oxidant solution test module 3 to determine if the feed meets the minimum requirements for the reprocessor. If the feed does not meet these requirements, it is sent to external disposal system 4. If the feed meets the minimum requirements for the reprocessor, in the preferred embodiment the feed is next sent through fluoride removal unit 5 and then filter unit 6, which contains the filter F14, before entering the preliminary preparation apparatus 8 ("input section") through line 101 where the temperature is stabilized. Level controllers and temperatures sensors are also provided in the input section. Once a prespecified temperature and level in the receiving flask is reached, the feed is drained into the product distillation system 9 shown in FIG. 1. It is during this phase of reprocessing that the pressure is decreased and the temperature is further increased. Prior to the junction 9b as shown in FIG. 1, the operation is conducted at atmospheric pressure.

From the product distillation system 9 in FIG. 1, purified $H_2SO_4$ ("product") is removed to the receiving tank 14 or recycled at junction 17 (by opening valve V8) depending on the analysis from the quality assurance system loop 13. From the receiving tank 14, the purified H₂SO₄ is transferred to the ozone addition module 16 where ozone from the ozone generator 15 is mixed with the purified H₂SO₄ to produce a combination of purified H₂SO₄ and ozone (a purified oxidant solution) for use in the semiconductor processing operation at the semiconductor processing station 1. Also from the product distillation system 9, gaseous water and liquid waste acid and heavy metal contaminants and particulates ("sludge") are removed into the waste removal system 10. The sludge is drained from the sludge reservoir in the removal system 10 to a waste collection tank ("T-3").

The coolant system 11 is a self contained unit which is used to vary the temperature of the coolant in the condenser of the product distillation system 9. A water supply 16 provides water to cool the heat exchanger of the waste removal system 10.

The pump system 12 provides a vacuum in certain structures in product distillation system 9 and waste removal system 10. While the pump system 12 is also connected to the preliminary preparation system 8, the connected lines are activated only to purge the system, since as previously indicated the preliminary preparation system 8 is at atmospheric pressure (while structures in the product distillation system 9 are at substantially vacuum pressures).

To completely describe the process and apparatus of the present invention, it is necessary to describe in detail the requisite apparatus and its operation. Therefore, Part I is a detailed description of the apparatus and refers generally to FIGS. 2-11. Part II is a detailed description of the operation of the apparatus and covers the following operations: start-up sequence; normal operations; auto-recycling sequence; and quality assurance.

PART I

General Features of the Apparatus

Referring to FIGS. 2-11, the valves V1-V24 are selectively opened and closed to control the direction of the flow and the ultimate destination of gases and fluids. In addition to flow regulation via opening and closing of the valves V1-V24, the flow rate may be monitored by a flow measurement device such as the flow measurement device attached to line 108 in FIG. 6 (labelled "flow monitor"). The valves V1-V24 may be controlled manually by a series of separate switches or combination of switches that the user may use to shut down the apparatus systemically.

Liquid level monitors and temperature sensors may be integrated into a system alarm to indicate unusual or dangerous conditions. The temperature sensors may be a thermocouple with a preset temperature and may be interfaced with a shut down mechanism on a heating system such that once the predetermined temperature is reached, the heating system is shut down. Moreover, the temperature sensors may be an integral part of heating systems which automatically maintaining a temperature which is set by the user of the heating systems; such systems are commercially available. The level sensors used with the apparatus of the invention are conventional, commercially available level sensors (e.g. acoustical/ultrasound or optical liquid level sensors). The temperature monitors and liquid level monitors allow the user to continuously check if the system is within the desired ranges.

Figure 7:
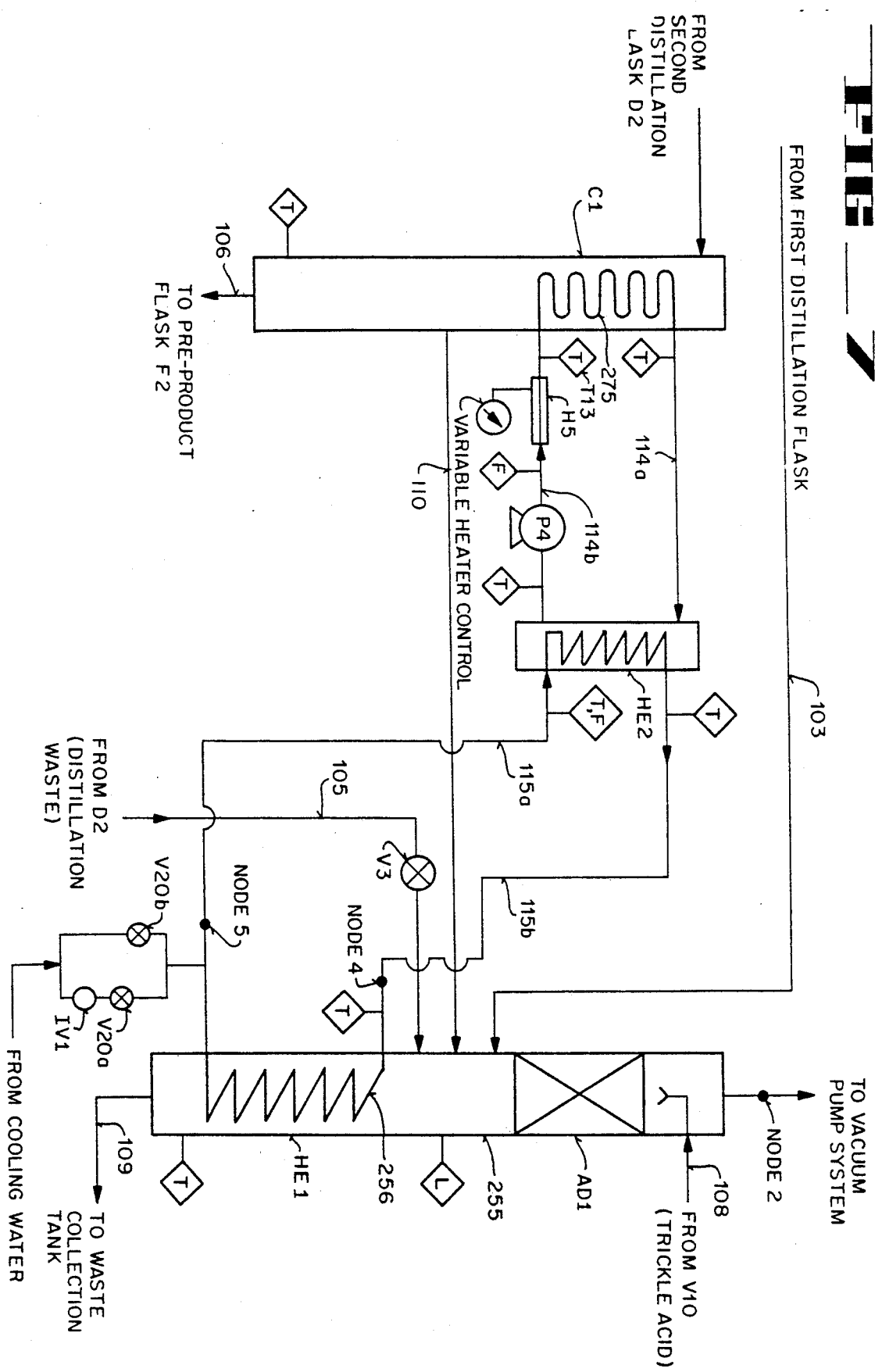
FIG. 7 is a detailed schematic representation of the coolant system in the apparatus.
Figure 5:
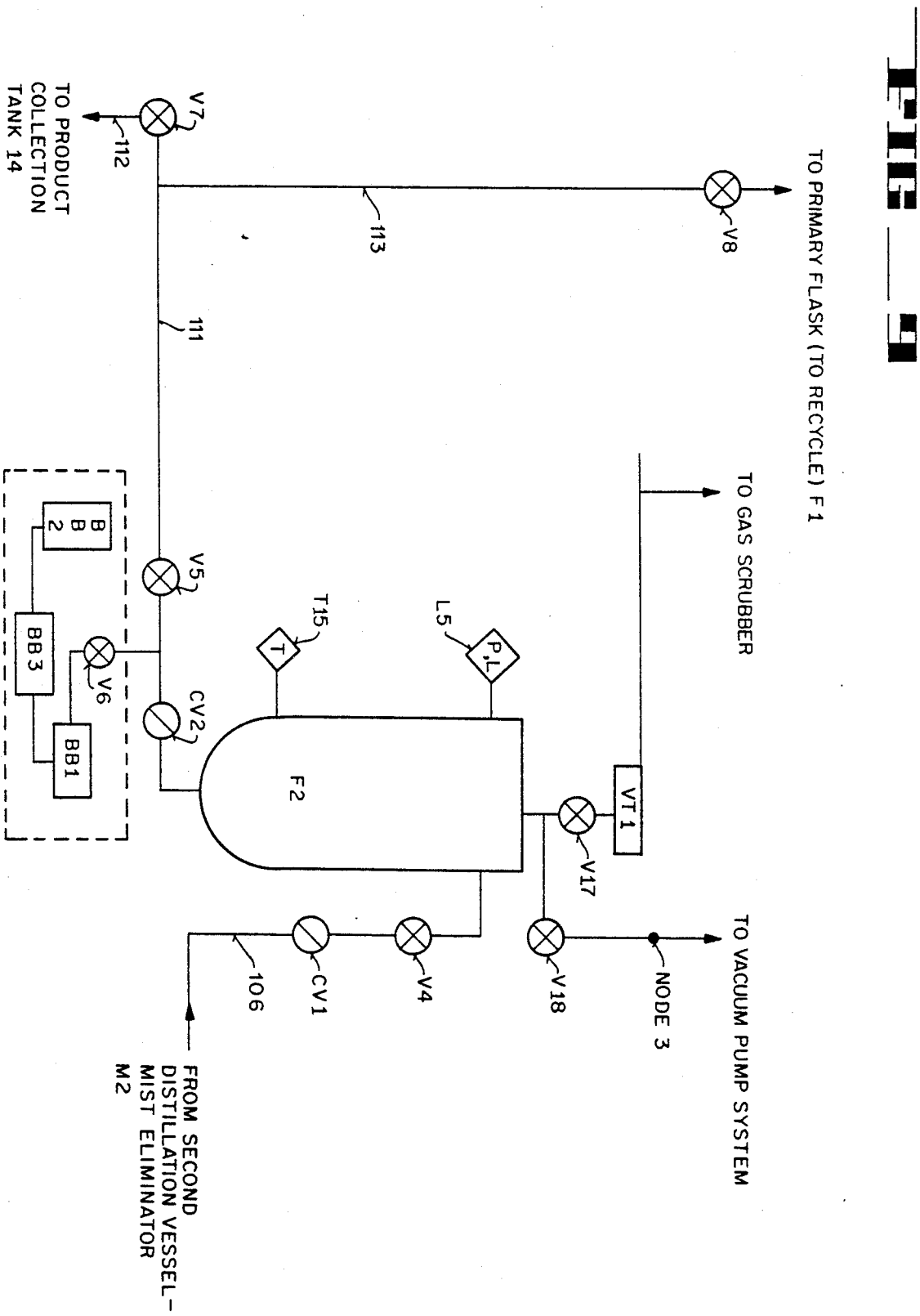

Referring to FIGS. 4, 6, 7 and 8, several pumps P1, P2, P3, P4 and P5 are shown. The pumps P1–P4 as shown in FIGS. 4, 6 and 7 are simple feed pumps. For example, pump P1 is indicated in FIG. 4 may be used to drive the feed forward to the input flask F1. Pump P2 as shown in FIg. 6 is used to drive liquid H₂SO₄ from the output of the heat exchanger HE1 to the top of the absorption column AD1. Pump P3 as indicated in FIG. 6 is used to drive deposited waste acid to a waste collection tank. Pump P4 may be a single stage rotary pump as shown in FIG. 7 which may be employed to circulate coolant through a self-contained system. These pumps are conventional, commercially available items.

The fifth pump, P5, is shown in FIG. 8 and is required to evacuate the apparatus to pressure levels of 5–10 Torr. This may be accomplished by using a simple conventional vacuum pump, such as an oil pump as in the present embodiment.

The nodes (e.g. Node 1) merely identify the points of interconnection between the various figures and are shown for the convenience of the reader. For example, it will be understood that Node 1 of FIG. 4 is connected to Node 1 of FIG. 5 and therefore, waste oxidant solution flask F1 of FIg. 4 is conveyed through a pipe means ("line") 102 to the first distillation flask means D1. It will be understood that liquids are transferred from one vessel to the next vessel by gravity feed where pumps are not shown. For example, gravity feed will provide the mechanism for transfer from vessel D1 to vessel D2 and for the transfer from sludge column 255 to purge column F4.

A. Preliminary Preparation System Apparatus

FIGS. 2a and 2b show detailed representations of the ozone destroyer 2. The waste oxidant solution ("feed") is removed by any conventional means (e.g., a pump or gravity feed) form the semiconductor processing station 1 through valve V301 and line 90, which exits the semiconductor processing station 1 to the ozone destroyer 2. Line 90 may be a pipe means which can be constructed from noncorrodible material such as Teflon ® or Kynar ® or any other similar materials. It will be appreciated that the other lines shown in FIGS. 1–11 are also pipe means which may be constructed from Teflon ® or conventional borosilicate glass (e.g., Pyrex ®); these pipe means are used to couple the various components (flasks, distillers, etc.). The preferred ozone destroyer 2 show in FIG. 2a, which is connected to line 90 to receive the waste oxidant solution, exposes the waste oxidant solution UV light to destroy the ozone remaining after processing. Such UV light systems are commercially available and are operated at a wavelength (usually 280–300 nm) which is well known to destroy ozone. As shown in FIG. 2a, the preferred ozone destroyer 2 includes a UV-light system 336 and a pipe means 90a that is transparent to UV (at proper wave length of 280–300 nanometers) and is situated closely to the UV-light system 336 to receive the UV light. Pipe means 90a is constructed from a material which is transparent to the UV-light at the appropriate wave length; typically, quartz glass may be used for the pipe means 90a which is coupled between line 90 and line 91 as shown in FIG. 2a. To facilitate the destruction of ozone passing through the pipe means 90a, the pipe means 90a may be heated by a conventional heating means (e.g., heating tapes surrounding portions of pipe means 90a.) In practice, most of the ozone will be destroyed after the waste oxidant solution leaves the bath and therefore the treatment in pipe means 90a will be sufficient to destroy any remaining ozone; however, further precautions may be take to prevent any ozone from reaching the reprocessor by using the alternative embodiment of the ozone destroyer shown in FIG. 2b instead of the ozone destroyer shown in FIG. 2a.

The alternative ozone destroyer 2, as shown in FIG. 2b, includes a UV light system 336, a tank 335, which receives the waste oxidant solution from line 91, and an air-tight vessel 332 which surrounds the tank 335. The vessel 332 includes two openings, air inlet 333 and air outlet 334, but is otherwise air-tight. The air inlet 333 is coupled to the atmosphere and may be connected, via suitable ducting materials, to the atmosphere at a location outside of any buildings. The air outlet 334 is connected, via suitable ducting materials, to a commercially available ozone destruction module, such as the OREC CDM-OT series Ozone Catalytic Destruct Module from Ozone Research and Equipment Corporation of Phoenix, Ariz. (at 3840 North 40th Ave., Pheonix, Ariz.). These ozone construction modules pull ozonized air out of the vessel 332 through the air outlet 334 and pull clean air into the vessel 333 through the air inlet 333. The UV light system 336 will destroy the ozone in the waste oxidant solution and any ozone which escapes the tank 335 (if any) will be pulled through the air outlet 334 into the ozone destruction module where it will be destroyed and the resulting air will be released into the atmosphere from that module. In order to facilitate the destruction of dissolved ozone in the waste oxidant solution in tank 335, the tank 335 may be heated by conventional heating means (e.g., heating mantle surrounding the tank). The feed next proceeds from tank 335 through line 91 to the waste oxidant solution test module 3 shown in FIG. 3.

Test module 3 includes a holding tank and analytical test equipment; the holding tank receives the waste solution from the pump P7 and is connected to the analytical test equipment to provide solution from testing. The feed will normally be tested for $H_2SO_4$ concentration. Such testing can be performed using well known techniques such as conductivity or density measurements. The feed could also be tested for fluoride, nitrate, chloride, metallic, or other ion content. These measurements could be performed by commercially available apparatus, such as ion-selective electrode, ion chromatograph, or atomic absorption. If the feed does not meet the predetermined minimum requirements for the reprocessor (e.g., sufficiently high concentration of sulfuric acid to meet the operating parameters of the reprocessor (e.g., greater than 93% in the preferred embodiment) and sufficiently low concentration of ionic impurities), it is drained by gravity through line 92 to external disposal system 4. When the feed is discarded to external disposal system 4, valve V24 is open and valve V23 is closed.

If the feed does meet the predetermined specifications, valve V24 is closed, valve V23 is opened, and the feed is pulled by pump P1 in the input section 8 through line 93 through fluoride remover 5. Removal of fluoride is performed by commercially available equipment such as a packed bed of activated alumina particles. Removing fluoride at this point protects the glass and quartz components of the reprocessor. The feed is next pulled through filter unit 6. The filter F14 in this unit 6 removes large particles which exceed the 100 micron pore size of this filter. Removal of these particles further protects the reprocessor from damage or unnecessary degradation.

FIG. 4 shows a detailed representation of the input system 8 of FIG. 1. The initial filter F14, with a pore size of 100 microns in the preferred embodiment, eliminates the majority of particles in the feed. Of course, it cannot eliminate particles created from further processing, such as the processing in the first distillation stage. Smaller pore sizes improve the purity of the product but require more frequent maintenance of the filter.

A simple pump P1 is positioned between valve V9 and the primary receiving flask F1 (input flask means). The primary receiving flask F1 may be constructed from any heat and chemical resisting material; however, borosilicate glass (e.g. Pyrex ® glass) is used in the preferred embodiment. Advantageously, flask F1 is coupled to a liquid level sensor and to a temperature sensor, such as temperature and level sensor 401. The waste oxidant solution is fed into the primary flask F1 from the line 101 through valve V9. The waste oxidant solution in the primary flask F1 is heated by a heating means H1, such as a heating mantle in the present embodiment. The temperature of the waste oxidant solution in flask F1 is typically maintained at approximately 175° C. The liquid level and temperature is monitored and regulated from the level sensor and temperature sensor which are attached to flask F1.

B. Product Distillation System

The apparatus shown in FIG. 5 comprises the product distillation system 9 of FIG. 1. The feed exiting from the primary flask F1 through valve V1 is transferred to a distillation vessel D1 (first distillation means) via line 102 and is heated in the vessel D1 by a heating means H2, such as a heating mantle as in the present embodiment. The heating means H2 is typically an automatically regulated heating device, the temperature of which is controlled based upon the temperature setting selected by the user and upon the output from a temperature sensor. Such heating means are commercially available. The heating means H2 periodically heats the vessel D1 to the requisite temperature (e.g. a temperature in the range of 200° F. to 300° F.) as specified by temperature sensor and the user selected temperature setting. The heat load to the first distillation column is largely dependent on the amount of water in the waste oxidant solution. In prior art waste oxidant solution processors, the addition of an oxidant to the $H_2SO_4$ also involves the addition of significant amounts of water. See for example U.S. Pat. No. 4,828,660 wherein the PDSA oxidant is generated by adding ultrapure $H_2O$ to an ultrapure stream of $H_2SO_4$ taken directly from the reprocessor. In the present invention, the addition of ozone as the oxidant does not involve the introduction of significant amounts of water to the oxidant solution. Since little water is added to the oxidant solution with the oxidant, and very little is formed by the semiconductor processing operation, the heat load to distillation vessel D1 is greatly reduced. In addition, because less water is boiled off in distillation vessel D1, less $H_2SO_4$ vapor is lost from the top of vessel D1 compared with the prior art reprocessors, improving the overall recovery of $H_2SO_4$.

The top of the vessel D1 includes a gaseous output and is capped with a packed distillation column DC1; that is, the distillation column is packed with a column packing means PM1. Although Rashig rings are used as the packing material PM1 in the column in the preferred embodiment, other suitable column packings such as Lessing rings or glass beads may also be used. An input pipe 23a, for reflux liquid (e.g. deionized water), is located near the top of the distillation column DC1 above the column packing material but below a mist eliminator M1. Line 103 is coupled to mist eliminator means M1. The use of the mist eliminator means M1 is advantageous but not necessary for the operation of vessel D1. Reflux liquid is discharged from the input pipe 23a and trickles over and through the packed column DC1. A source of deionized water is maintained under a vacuum and is coupled to valves V19a and V19b; the deionized water is supplied to input pipe 23a through valves 19a and 19b. The vapor outlet, located at the upper-most portion of the column DC1 along with a mist eliminator M1, is coupled to the waste disposal system 10 of FIG. 6 through line 103. The mist eliminator M1 is essentially a deatomizer removing any particles or condensation from the vapor, thus ensuring that only the desired vapor from the distillation mixture is inputted to the waste output system 10. Mist eliminator means M1 may be comprised of glass wool or other suitable means for removing particles and condensed water droplets from the gaseous water leaving D1. The line SL1 of the distillation vessel D1 provides a means for transferring the distillation mixture containing the partially purified $H_2SO_4$ to a second distillation means vessel D2 through valve V2 and line 107, thus providing careful regulation of the transfer between the first and second distillation vessels. The vessel D1 and the column DC1 may be constructed from borosilicate glass such as Pyrex ®.

The second distillation vessel D2 (second distillation means) is similar to the vessel D1. D2 is also seated in a heating means, such as a heating mantle H2, which heats the distillation mixture to a temperature higher than that of vessel D1. An attached temperature sensor 402 is used to control and monitor the temperature within the distillation vessel D2. The vessel D2 includes an input which is coupled to line 107. The distillation vessel D2 is capped by a distillation column DC2. Unlike the distillation column of D1, there is no deionized water trickle input pipe at the top of the distillation column for D2. However, there is a vapor outlet which is coupled through a mist eliminator M2 to the tubular shell of the condenser C1. An outlet located near the bottom of distillation vessel D2 provides for the release of the remaining sludge mixture in vessel D2 which flows, through line 105, to the waste disposal system of FIG. 6 when the valve V3 is open. Valve V3 may be periodically opened (thereby periodically draining vessel D2) or may be continuously open (partially) to slowly and continuously drain vessel D2.

The product (pure $H_2SO_4$) in its gaseous state travels through line 104 and enters the tubular shell (e.g. glass jacket) of condenser C1 where it is cooled to its liquid state by the coolant flowing through the coil 275 of the condenser C1 and then it collects in the lower portion of condenser C1 until it overflows into the pre-product vessel flask F2. The product then proceeds through check valve CV1, valve V4 and into the pre-product vessel F2 shown in FIG. 9. The vessel D2, the column DC2 and the condenser C1 may be constructed from borosilicate glass, such as Pyrex ®.

C. Waste Disposal System

The waste disposal system 10 is shown in FIG. 6. This system is comprised of a purge column F4 and a sludge column 255 which includes a heat exchanger means HE1. The sludge column 255 receives inputs from the distillation column DC1 through line 103, the condenser C1 through line 110, and the distillation vessel D2 through line 105. The heat exchanger means HE1 is positioned relative to the vessel D2 in such a manner as to allow the heat exchanger HE1 to fill to a level controlled by the filling of distillation flask D2 and valve V3. The level of sludge may be carefully monitored by a liquid level sensor attached to sludge column 255 and may be controlled by opening and closing valve V3. The sludge column 255 also includes an absorption column AD1. Although, the packing material of the column AD1 is Rashig rings in the preferred embodiment, any other suitable packing material PM2 such as Lessing rings or glass beads may be used.

The sludge exiting line 105 into the heat exchangers HE1 passes over the coils 256 of the heat exchanger HE1 and is cooled by the cool water flowing through the coil 256. The coil 256 of the heat exchanger HE1 is filled with cooling water, which flows through a closed loop (via lines 115a and 115b) which is temperature controlled through the exchanger HE2 shown in FIG. 7. The sludge, which is under vacuum in the sludge column during normal distillation processing, will collect within the tubular shell of HE1 until drained periodically into the purge column F4, which is also under vacuum during normal distillation processing. The purge column F4 may be drained while continuing an ongoing distillation (under vacuum in vessels D1, D2, C1 and the sludge column 255) by closing valve V11 and allowing the purge column F4 to come to atmospheric pressure (by closing valve V14 and opening valve V13) and then by pumping the sludge out of purge column F4 by pump P3 through momentarily opened valves V12 and CV4 and into a waste collection tank. The purge column F4 may be filled from the sludge column 255 while continuing an ongoing distillation by opening valve V11 while the purge column F4 is under vacuum (the purge column F4 is kept under vacuum by keeping valve 14 open while valves V13, V15 and V12 are closed).

A reflux liquid inlet 23b is positioned above the packing material PM2 in the absorption column AD1. The output of the heat exchanger HE1 (typically a liquid acid waste) is tapped off at valve V11 and is pumped via pump P2 through line 108 to the top of the absorption column AD1 where the liquid acid waste then trickles down through the packing material PM2 condensing any vaporous materials, which then pass back through the heat exchanger HE1. This also protects vacuum pump system 12, by reducing the amount of vaporous acid escaping out of the top of sludge column 255. This can be assured by adding water to the reflux line 108 through line 108a which drastically lowers the sulfuric acid vapor pressure. Line 108a is coupled through a valve V30 to a supply of deionized water. The valve V30 is periodically opened to allow the deionized water to pulled by vacuum into line 108 to thereby dilute the waste acid in column 255. Alternatively, the amount of acid vapor escaping out of the top of sludge column 255 can be reduced by ensuring that the temperature of the sludge in sludge column 255 is kept low, typically below 30° C. This can be accomplished by flowing the proper amount of cooling water through the coil 256 of HE1. The colder the waste acid in HE1, the better, but care must be taken to not freeze the waste acid.

D. Coolant System

The cooling system 11 shown in FIG. 7 is comprised of two interconnected closed-loop systems. A pump P4, which may be, for example, a single stage rotary pump in the preferred embodiment, circulates the coolant which is typically an oil (e.g., Dowtherm) in lines 114a and 114b and through the system which includes HE2 and C1. Temperature increases are provided by a variable heater H5 (variable heater H5 may be any conventional variably controlled heating means such as a variably controlled heating jacket which surrounds line 114b) with the temperature being monitored at an output of heater H5 by temperature sensor T13. The oil coolant is circulated through the coil 275 of the condenser C1 which is disposed within the tubular shell of the condenser C1. The coolant is also circulated through the jacket (tubular shell) of heat exchanger HE2. Both the input and the output to the coil 275 of condenser C1 are monitored with temperature sensors, including temperature sensor T13. Cooling water is circulated through the second system comprised of the heat exchanger HE1 and the heat exchanger HE2 and lines 115a and 115b. The cooling water circulates through the lines 115a and 115b and through the coils disposed within heat exchangers HE1 and HE2. Input valve IV1 and control valves V20a and V20b provide the cooling water to HE1 and to HE2 from an outside source of water, typically at room temperature. Temperature and flow sensors may be used to monitor temperature and flow parameters. The temperature of the water coolant may be altered at heat exchanger HE2 by varying the temperature of the oil coolant in the first system.

E. Vacuum Pump System

The pump system 12 is described in conjunction with FIg. 8. To obtain vacuums of 5–10 Torr, the vacuum pump P5 may be an oil pump. The pump P5 is attached to an external, conventional gas scrubber. To protect the input of the vacuum pump P5, a conventional vapor trap VT3 may be installed to trap any gaseous vapors that may come through the lines, but it is not necessary for the operation of the vacuum pump system. The pressure is monitored by a conventional pressure control sensor PC1. Nitrogen gas ($N_2$) may be used to compensate the pressure reduction produced by the vacuum pump P5 by bleeding $N_2$ into the input of pump P5 through valve VN2.

F. Quality Assurance System

FIG. 9 shows the product removal and quality assurance system 13. The product exiting from the condenser C1 is directed through line 106 and the valves CV1 and V4 into the pre-product flask F2. The product may be driven by gravity to the flask F2. From an output line 111 of flask F2 a product sample is analyzed by a conventional particle counter BB1, by a conventional ion detector BB2, and a conventional density monitor BB3 measuring the particle count and metal contaminants remaining after the reprocessing cycle. If the analysis indicates levels that are not within desired specifications, the produce is shunted through valve V8 into the input flask F1 where it is recycled for reprocessing. If the analysis indicates levels that are within the desired specifications, then valves V5, V17, CV2 and V7 are opened (with valves V18, V4 and V8 closed) and the product drains from flask F2 into a product collection tank 14. Valve V17 is coupled to a venturi vacuum pump which is coupled to a conventional gas scrubber; opening valve V17 releases any pressure in flask F2, and allows a rough vacuum to be pulled using a vapor trap VT1 before opening V18 to reconnected to the vacuum system.

G. Ozone Generation and Addition Systems

FIG. 10 shows the ozone generator 15. The ozone generator 15 could use either an arc discharge process or an electrochemical cell to produce ozone. Ozone generators are commercially available from, for example, PCI Ozone and Ozone Research and Equipment Company. In the case of an arc discharge process, the feed for ozone generator 15 through line 120 is ultrapure oxygen. Also in the case of an arc discharge process recycled oxygen from ozone addition module 16 is added to the oxygen gas feed line 120 through line 122. In the case of an electrochemical cell, the feed through line 120 is ultrapure, deionized (DI) water. In either case, the ozone generator 15 produces a stream of ultrapure ozone in oxygen, exiting the unit through line 121, which is coupled to the ozone addition module 16.

FIGS. 11a and 11b show the preferred and alternative embodiments of the ozone addition module 16. In FIG. 11a, the tank 18 is supplied with ultrapure $H_2SO_4$ by line 116, which ultrapure $H_2SO_4$ is delivered from line 116 from product collection tank 14 by a means such as a pump or an ultrapure, inert gas, such as nitrogen. Ozone enters the tank 18 through line 121 from the ozone generator 15. The ozone is bubbled through the $H_2SO_4$ and tank 18, preferably to the point of saturation of the $H_2SO_4$ solution with ozone. Any remaining ozone is treated in the ozone destroyer 19 to form pure $O_2$. Such units expose the ozone to the proper wavelength of ultraviolet light (280–300 nm) and are commercially available. If ozone generator 15 is an arc discharge generator using $O_2$ as feed gas, the stream of pure $O_2$ is then recycled through line 122 to ozone generator 15.

FIG. 11b shows an alternative embodiment of the ozone addition module. This ozone addition module is an in-line ozone injector. The injector 20 injects the ozone and oxygen into the stream of ultrapure $H_2SO_4$, from product collection tank 14. In this embodiment, ozone is injected downstream of the product collection tank 14. In the extreme, the injector could be in the processing station 1 with the semiconductor wafers which are being stripped or cleaned (e.g., see Japanese Patent Application Publication No. 62-69612). In this extreme, the injector is placed at the bottom of the tank of the processing station 1 which is used to hold the wafers and the ozone bubbles out of the injector and around the wafers. In all embodiments, it is useful to place a negative vacuum hood over the processing station 1 to collect any ozone which escapes from the processing station 1. Various such hoods are commercially available and the vent output of the hood would normally be connected to a commercially available ozone destruction module (e.g., the OREC CDM-OT series modules).

After ozone has been added by either of the embodiments of the ozone addition module 16, the product oxidant solution comprised of ultrapure $H_2SO_4$ and ozone is fed to the semiconductor processing station 1 for use in cleaning or stripping wafers. To enhance the cleaning or stripping effect, the oxidant solution may be treated in pre-treatment unit 21, shown in FIG. 1. The treatment may be comprised of heating the oxidant solution, exposing the oxidant solution to UV light, or both. Both of these treatments increase the effectiveness of the cleaning or stripping properties of the oxidant solution. Alternatively, the functions of pre-treatment unit 21 can be carried out in semiconductor processing station 1.

PART II

THE OPERATION

A. The Start-Up

When the system is initially set up or has been completely purged and cooled, an allotment of approximately several (e.g. 4) hours should be used to bring the system to operating temperature and pressure. The slow start-up is designed to minimize thermal stress to the system. Minimal stress lengthens the lifetime of the apparatus' components, which is desired from both an economic and safety standpoint. Components weakened by stress will be more likely to initiate a safety hazard or malfunctions.

Referring generally to FIGS. 1-11, the start-up operation proceeds as follows:

The front end of the process, i.e. the preliminary processing up to valve V1 is conducted at standard atmospheric pressure (760 Torr). Line 90 exiting semiconductor processing station 1 is coupled to pump P7 which pulls feed from semiconductor processing station 1 through ozone destroyer 2 to waste oxidant solution test module 3. The input line 101 exiting filter unit 6 is coupled to the pump P1 which pulls the feed from the waste oxidant solution test module 3 through the input filter F14 and input valve V9. A desired amount of feed is pumped into the flask F1 via line 101. After heating the feed by a heating means H1 to a temperature in the range of 175° C. (347° F.), the feed is drained through line 102 and valve V1 into the first distillation flask D1.

Once the feed is in distillation flask D1, valve V1 is closed and the heating means H2 slowly raises the temperature of the feed to an operating temperature of greater than 175° C. (347° F.). During the heating process at distillation means D1, the vacuum pump system 12 (vacuum generation means) decreases the pressure by means of the vacuum pump P5. Concurrent with this latter operation, i.e., increased temperature and decreased pressure, the oil coolant system, which includes coil 275, lines 114a and 114b and the heat exchanger HE2, is started up and raised to an operating temperature of approximately 105° C. (221° F.).

The vacuum pump P5 pulls a vacuum in vessels D1 and D2 through the condenser C1 and the sludge column 255. The sludge column 255 is coupled to the vacuum pump system 12 at node 2 as shown in FIGS. 6, 7 and 8; the purge column F4 is coupled to the vacuum pump system 12 through valve V14 at node 2 as shown in FIGS. 6 and 8. The pre-product flask F2 is coupled to the vacuum pump system 12 through valve V18 at node 3 as shown in FIGS. 8 and 9. It will be appreciated that during the generation of a vacuum in vessels D1 and D2, and in condenser C1 and sludge column 255, valves V1, V4 and CV1 are closed. After filling the flask D1 with waste oxidant solution, valve V1 is closed to allow the generation of a vacuum. Similarly, valves V11, V12, V17, V5 (and CV2), V13 and V15 will normally be closed while generating a vacuum in vessels D1 and D2. The vacuum in D2 is generated through line 104, condenser C1, line 110, and the sludge column 255, and the vacuum in D1 is generated through line 103 and the sludge column 255. After the vacuum is generated to the operating levels specified below, the apparatus may be used in the standard mode of operation.

B. The Standard Mode of Operation

Referring to FIGS. 1-11, the standard mode of operation proceeds as follows:

The feed from line 90 proceeds as previously described in Part IIA, (Start-Up). That is, the feed is pumped through ozone destroyer 2, where any ozone remaining after processing in semiconductor processing station 1 is destroyed. It is next pulled through waste oxidant solution test module 3 to test for $H_2SO_4$ concentration, fluoride, nitride, chloride, metallic or other ion content. If the waste oxidant solution does not meet predetermined standards, valve V23 is closed, and the feed is driven by gravity to external disposal system 4 through open valve V24. If the waste oxidant solution meets the predetermined specifications, valve V23 is open, V24 is closed and, in the preferred embodiment, the waste oxidant solution is next pulled through fluoride remover 5, where the fluoride is removed. Fluoride remover 5 is, for example, a packed bed of activated alumina particles, and is commercially available. The waste oxidant solution is then pulled through filter unit 6 to remove large particles. The feed is next pumped into the flask F1, through the input valve V9. The input filter F14 eliminates most of particulate matter greater than 100 microns prior to the actual distillation process.

The feed reservoir in flask F1 is maintained at standard atmospheric pressure and heated to a temperature of about 175° C. (347° F.). The temperature is maintained within this range by continuous monitoring of the temperature sensor on flask F1 and controlling a heating means H1 (e.g. a heating mantle) which surrounds the flask F1. Through valve V1 via line 102, the feed is collected in the first distillation flask D1. After the flask D1 is filled, the valve V1 is closed to allow for the vacuum to be stabilized in flask D1. In the first distillation flask D1, the temperature range is maintained between 149° C.-204° C. (300° F.-400° F.), and the operating pressure is decreased to a range of 5-25 Torr.

In the first distillation flask D1, the lower boiling point compounds such as water and unreduced compounds are separated from the acid. The distillation column DC1 attached to the flask D1 is packed with a column packing means PM1 (e.g. glass rings or beads, such as Rashig rings). As the mixture in flask D1 is heated, the water is boiled off, rising into the packed column of D1 and exiting at the uppermost outlet into line 103 after passing through a mist eliminator M1. However, as the $H_2SO_4$ and $H_2O$ rise into the column it is mixed with a trickle of deionized water provided through an input pipe 23a at the top of the packed column DC1, thereby causing the $H_2SO_4$ to be recondensed into the distillation mixture within the flask D1. After the acid has reached the desired (e.g. 97%) concentration the valve V2 is opened and distillation mixture is drained through line 107 and valve V2 into the larger second distillation flask D2 where the next step of the process commences. After filling flask D2, the valve V2 is closed. The second distillation flask D2 is maintained at a higher temperature range of approximately 190° C.-218° C. (375° F.-425° F.) and at a lower pressure of approximately 5 Torr. In addition to the heating means H3 which surrounds the flask D2, several smaller heating means H4a-c are positioned within the distillation flask D2. To provide for more efficient agitation of the distillation mixture, a stirrer ST1 is also included in the distillation flask D2.

In the second distillation, high purity $H_2SO_4$ is distilled. The higher boiling compounds (e.g., heavy metals) are retained in the bottom of the distillation flask D2.

Decreasing the pressure, particularly in flask D2, decreases the boiling point of the $H_2SO_4$, thus allowing the system to be operated at a lower temperature. Lowering the pressure also lowers the density of the product gas. Decreasing the temperature causes the differential between chemical activities of the $H_2SO_4$ and of the heavier sludge to increase. As the difference of the two activities is increased the likelihood of increased product purity is also increased. Since the density of the gas and therefore the terminal velocity of the particles (e.g. particulate contaminants) is decreased, the ability of the particles to escape the liquid phase is reduced. Therefore, the particles remain within the distillation mixture within the flask D2. In addition to the particles in the distillation mixture, the sludge contains (metals) compounds that boil at a higher temperature. These metal compounds have a greater dependency on temperature changes. Thus as the pressure is decreased, the boiling points of the sludge and the $H_2SO_4$ change at different rates. The different dependencies increase the ability to separate the desired $H_2SO_4$ from the metal compound contaminants.

As the $H_2SO_4$ in flask D2 is converted into the gaseous (g) form, it rises through the distillation column DC2 which caps the distillation flask D2 and rises through the mist eliminator M2. The $H_2SO_4$ (g) flows out of the distillation column DC2 via line 104 and into the primary condenser C1 at which point the gaseous $H_2SO_4$ condenses into highly pure liquid $H_2SO_4$ which flows into a lower reservoir of the primary condenser C1. However, the temperature of the product is still elevated beyond that of room temperature and the product remains in the condenser C1 until the product is drained from the condenser C1 into the flask F2 through line 106. The condenser C1 is drained usually only when the flask F2 is kept under a vacuum. Thus, if any product has previously been drained into flask F2, that product in F2 will be under vacuum (valve 18 open while valves V17, CV2 and V5 are closed). The condenser C1 is drained (by gravity feed) when valve V4 is opened after a vacuum has been established in flask F2; after filling flask F2 to the desired level, valves V4 and CV1 are closed. The product may be drained by gravity feed from flask F2 while continuing an ongoing distillation by closing V18 (and assuring that valve V4 is closed) and by opening valve V17 to bring the pressure in flask F2 back to atmospheric pressure. After draining the desired amount of product from flask F2 through line 111 and valves V5 and CV2, the flask F2 is again depressurized to produce a vacuum in flask F2 (by closing valves V17, CV2 and V5 and by opening valve 18).

The distillation mixture remaining in D2 is coupled through line 105 and valve V3 to an input of the sludge column 255. When the operator desires to empty D2, the valve V3 is opened and the sludge and other materials remaining in D2 escape from D2, flow through line 105, an enter the heat exchanger means HE1 at the lower portion of the sludge column 255. Improved product purity may be obtained by continuously and slowly draining D2 while in normal operation by keeping valve V3 slightly open. The sludge column 255 also has an input from the condenser C1 via line 110 and has an input from the gaseous output of vessel D1 via line 103. Line 103 provides water and other low boiling compounds from vessel D1 into the sludge column 255; the water from vessel D1 tends to dilute the sludge from vessel D2.

The diluted sludge rests in the heat exchanger means HE1 in the bottom of the sludge column until the sludge column 255 is drained by opening valve V11. The diluted sludge, which is typically a weak acid, is recirculated through the sludge column 255 by pumping (by pump P2) a slow trickle of the diluted sludge through line 108 (and open valve V10). The diluted sludge trickles from the input pipe 23b and through the packing material PM2 of the absorption column AD1 and back into the heat exchanger HE1. The trickling of diluted sludge through the sludge column 255 tends to absorb any vapor and keep it within the column 255. The coil 256 of the heat exchanger HE1 tends to cool the sludge mixture (while heating the water coolant) and thereby heating cooling water which flows through the tubular shell of the heat exchanger HE2.

During an on-going distillation, the sludge column 255 is drained by filling (via gravity feed) the purge column F4 while the column F4 is kept under vacuum. Column F4 is kept under vacuum during normal distillation operations by keeping valve V14 open while valves V12, V13 and V15 are closed. When valve V11 is opened while column F4 is under vacuum, the diluted sludge from the sludge column 255 flows (by gravity) through line 109 into the column F4. Typically, column F4 is positioned relative to column 255 so that some diluted sludge remains in the column 255 to cover the coil 256. After draining a desired amount of sludge into the purge column F4, valve V11 is closed.

During an on-going distillation, the purge column F4 may be drained by opening valves V12, V13, and V15 while closing valve 14 (valve V11 will of course also be closed). The diluted sludge from F4 is pumped by pump P3 to a waste collection tank.

The dilute acid (diluted sludge) which is trickled (refluxed) through the sludge column 255 will have an impact on the vacuum pressure in the distillation system, including the vacuum pressure in the vessel D2. Specifically, the amount and temperature of the trickle (reflux) through column 255 will set a minimum limit on the vacuum pressure; up to a certain point at a given temperature of the reflux, a greater amount of reflux will allow a lower vacuum pressure to be attained. Therefore the amount of reflux and the pump P2 should be adjusted to allow achievement of the vacuum levels set forth above, particularly in vessel D2. The temperature of the reflux in column 255 will also have an even more significant impact on the vacuum pressure by setting a minimum limit on the vacuum pressure. At a given reflux concentration and pressure, a lower temperature for the reflux through column 255 will permit a lower vacuum pressure to be obtained. In practice, the temperature of the reflux is controlled by controlling the temperature of the cooling water which flows through the coil 256 of HE1 or by controlling the size of HE1. The reflux of dilute acid in column 255 serves as a means for setting the minimum vacuum pressure in the distillation system. Alternatively, the reflux of dilute acid through the column 255 may be replaced by a condenser coil located near the top of the column 255, which coil acts as a means for setting the minimum pressure. This condenser coil (through which a coolant flows) may be provided near the top of the column 255 instead of the column packing AD1 and instead of the reflux input 23b. The condenser coil would work in the same fashion as the reflux of dilute acid; specifically, a lower temperature for the condenser coil (at a given concentration of dilute acid in column 255) permits a lower (minimum) vacuum pressure to be attained.

C. Quality Assurance

While referring to FIGS. 4 and 9, the in-line quality assurance loop will be described. The in-line quality assurance system 13 (shown in FIG. 1) is the most reliable way to obtain an accurate particle count (BB1), since the sampling is taken directly from the distillation column rather than removing the liquid product from the receiving tank T2 where the possibility of handling contamination is increased.

The product received in the pre-product flask F2 is monitored by temperature sensor T15 and level sensor L5. Once the desired level of product in flask F2 is attained, some of the product is drained through valve CV2 and valve V6 into the quality assurance loop. Once a sufficient amount of the product is through valve V6, valve V6 is closed and the product is processed in the conventional particle counter BB1, a conventional density monitor BB3 and finally in a conventional metal ion measurement device (e.g., ion chromatograph BB2).

If the purity is within the desired specifications valve V18 is closed and valve V5 and CV2 are opened and the product in the pre-product flask F2 drains into the product collection tank 14 through line 111, valve V7 and line 112.

D. Recycling

If the purity as determined by the quality assurance system 13 is not within the desired specifications, the product in pre-product flask F2 is recycled back into the feed line 101 through line 111 and line 113 by opening valve V8 while keeping valve V7 closed. This allows the product not meeting the requisite purity standard to be recycled through the distillation process.

E. Ozone Generation and Introduction

The purified oxidant solution which is used in stripping or cleaning operations in semiconductor processing station 1 is obtained by mixing the purified $H_2SO_4$ from tank 14 with ozone from the ozone generator 15. The ultrapure $H_2SO_4$ is delivered from product collection tank 14 through line 116 by conventional means noted above. From there, the ultrapure $H_2SO_4$ flows through ozone addition module 16. In the ozone addition module 16, sufficient ozone is bubbled or injected into the ultrapure $H_2SO_4$ to saturate the solution in the preferred embodiment. Alternatively, a lesser quality of ozone may be added, depending upon the requirement of the semiconductor manufacturing process. The oxidant solution, comprising ultrapure $H_2SO_4$ and ozone, then exits ozone addition module 16 through line 117 and is fed either through pretreatment module 21 before reaching semiconductor processing station 1 or directly to semiconductor processing station 1. As noted above, the ozone may be first mixed with the ultrapure $H_2SO_4$ at semiconductor processing station 1.

We claim:

1. A system for the chemical repurification and regeneration of an ultrapure oxidant solution comprised of sulfuric acid ($H_2SO_4$) and ozone ($O_3$) used in a chemical process at a process center comprising:
   means for removing a waste oxidant solution from said process center;
   means for separating said $H_2SO_4$ from water contained in said waste oxidant solution;
   means for distilling to remove particles and dissolved impurities from said $H_2SO_4$;
   means for condensing said $H_2SO_4$ into a stream of ultrapure condensed $H_2SO_4$; and
   means for generation of said ozone and introduction of said ozone into said $H_2SO_4$ to produce said ultrapure oxidant solution for use at said process center.

2. The system as described in claim 1 further comprising a means for destroying said ozone, said means for destroying said ozone being coupled to said means for removing.

3. An acid reprocessor at a semiconductor processing station for reprocessing waste oxidant solution containing contaminated $H_2SO_4$ from a semiconductor processing operation at said semiconductor processing station, said acid reprocessor comprising:
   an input flask means for receiving said waste oxidant solution containing contaminated $H_2SO_4$, light boiling contaminants, particulates and water, said input flask means having an output for outputting said waste oxidant solution;
   a first distillation having an input coupled to said output of said input flask means to receive said waste oxidant solution and having a gaseous output being coupled to a first column packed with a column packing means, a first heating means for heating said waste oxidant solution in said first distillation means to boil off water and other light boiling contaminants from said waste oxidant solution to produce an enriched acid, said light boiling contaminants and water escaping from said gaseous output through said fist column of said first distillation means, an input in said first column to receive reflux liquid which is trickled through said first column to retard loss of $H_2SO_4$ in said first distillation means, a feed output from said distillation means for said enriched acid;
   a second distillation means having an input coupled to said feed output for receiving said enriched acid, a second heating means for heating said enriched acid in said second distillation means to boil off substantially pure $H_2SO_4$, through a second column leaving an acid waste sludge in said second distillation means, said second distillation means having a first output for providing said substantially pure $H_2SO_4$, said first output being coupled to a condenser to condense said substantially pure $H_2SO_4$, said second distillation means having a second output for removing said acid waste sludge from said second distillation means;
   a vacuum generation means coupled to said first and second distillation means, providing a reduced operating pressure in said first and second distillation means, such that said particulates remain in said acid waste sludge;
   an ozone generation means to produce ozone;
   an ozone introduction means to introduce said ozone into said substantially pure $H_2SO_4$, said ozone introduction means being coupled to said ozone generation means, said substantially pure $H_2SO_4$ mixed with ozone being used at said semiconductor processing station for said semiconductor processing operation;

a waste collection tank providing for removal of said acid waste sludge from said second distillation means through a second output.

4. The acid reprocessor as described in claim 3 wherein said vacuum generator means further includes a heat exchanger means comprising:

a cooling means including a second coil through which a coolant flows and having a first input coupled to said gaseous output of said first distillation means to receive said water escaping from said first distillation means and having a second input coupled to said second output of said second distillation means to receive said acid waste sludge;

a third column packed with column packing means and having an input to receive a waste acid which is trickled through said third column, such that said input receives said waste acid which is trickled through said third column provides a means for setting the minimum vacuum pressure in the distillation system.

5. The acid reprocessor as described in claim 4 wherein said first distillation means, said second distillation means and said heat exchanger means are comprised substantially of borosilicate glass and wherein said semiconductor processing operation comprises the removal of photoresist from semiconductor wafers.

6. An acid reprocessor at a semiconductor processing station for reprocessing waste oxidant solution containing contaminated sulfuric acid ($H_2SO_4$) from a semiconductor processing operation at said semiconductor processing station, said acid reprocessor comprising:

an input flask means for receiving said waste oxidant solution containing contaminated $H_2SO_4$, light boiling contaminants, water and particulates, said input flask means including a first heating means for heating said waste oxidant solution, said input flask means having an output for outputting said waste oxidant solution;

a first distillation means having an input coupled to said output of said input flask means to receive said waste oxidant solution and having a gaseous output being coupled to a first column packed with a column packing means, said first distillation means having a second heating means for heating said waste oxidant solution to boil off said water and said light boiling contaminants from said waste oxidant solution to produce an enriched acid, said contaminants escaping from said gaseous output through said first column and through a mist eliminator means of said first distillation means, said first column having an input to receive reflux liquid which is trickled through said column to retard loss of $H_2SO_4$ in said first distillation means, said first distillation means having a feed output for providing said enriched acid;

a second distillation means having an input coupled to said feed output for receiving said enriched acid, said second distillation means having a third heating means for heating said enriched acid to boil off substantially pure $H_2SO_4$, through a second column leaving an acid waste sludge in said second distillation means, said second distillation means having a first output for providing said substantially pure $H_2SO_4$, said first output being coupled to a tubular shell of a condenser to condense said substantially pure $H_2SO_4$, said condenser having a first coil through which a coolant flows to cool the substantially pure $H_2SO_4$ which flows through said tubular shell, said second distillation means having a second output for removing said acid waste sludge from said second distillation means;

a heat exchanger means having a cooling means including a second coil through which a coolant flows and having a first input coupled to said gaseous output of said first distillation means to receive said water escaping from said first distillation means and having a second input coupled to said second output of said second distillation means to receive said acid waste sludge, said heat exchanger means having a third column packed with column packing means and having an input to receive waste acid which is trickled through said third column;

a vacuum generation means coupled to provide a vacuum in said first distillation means and in said second distillation means, said vacuum generation means producing a vacuum in said second distillation means to reduce said particulates of said substantially pure $H_2SO_4$;

an ozone generation means to produce ozone;

an ozone introduction means to introduce said ozone into said substantially pure $H_2SO_4$, whereby said acid reprocessor provides a reprocessed semiconductor grade $H_2SO_4$ and ozone at said semiconductor processing station from waste oxidant solution of a semiconductor processing operation.

7. The acid reprocessor as described in claim 6 further comprising an ozone destruction means for destroying said ozone, said ozone destruction means coupled to an output of said semiconductor processing operation, said ozone destruction means having an output coupled to said input flask means.

8. The acid reprocessor as described in claim 6 wherein said input to receive waste acid which is trickled through said third column provides a means for setting the minimum vacuum pressure in the distillation system and for protecting said vacuum generation means and wherein said first distillation means and said second distillation means are comprised substantially of borosilicate glass.

9. A process for the regeneration and repurification of ultrapure oxidant solution comprising ultrapure sulfuric acid ($H_2SO_4$) and ozone which is used in a chemical process at a chemical processing center, comprising:

withdrawing at least a portion of said oxidant solution used in said chemical process;

distilling said withdrawn oxidant to remove particles and dissolved impurities to form $H_2SO_4$;

generating ozone and introducing said ozone into said $H_2SO_4$ to produce said ultrapure oxidant solution for use at said chemical processing center.

10. The process as described in claim 9 wherein said chemical process is a semiconductor processing operation and said chemical processing center is a semiconductor processing station.

11. A method for reprocessing waste oxidant solution containing contaminated sulfuric acid ($H_2SO_4$) from a semiconductor processing operation at a semiconductor processing station, said method comprising the steps of:

receiving from said semiconductor processing station said waste oxidant solution containing contaminated $H_2SO_4$, light boiling contaminants, water and particulates in an input flask means having a first heating means for heating said waste oxidant solution, and outputting said waste oxidant solution from an output of said input flask means;

first distilling said waste oxidant solution in a first distillation means having an input coupled to said output of said input flask means to receive said waste oxidant solution and having an gaseous output coupled to a first column packed with a packing material comprised of glass rings and a first mist eliminator means coupled to the output of said first column, said first distillation means having a second heating means;

heating said waste oxidant solution by said second heating means such that water is boiled off from said waste oxidant solution to produce an enriched waste oxidant solution, said water escaping said first distillation means from said gaseous output through said packing material in said first column of said first distillation means and then through said first mist eliminator means;

refluxing liquid that is trickled through a reflux input of said first column to retard distillation of $H_2SO_4$ in said first distillation means, wherein said first distillation means has a feed output for said enriched waste oxidant solution;

second distilling in a second distillation means having an input coupled to the output of said first distillation means for receiving said enriched waste oxidant solution, said second distillation means having a third heating means;

heating said enriched waste oxidant solution with said third heating means and vaporizing substantially pure $H_2SO_4$ from said enriched waste oxidant solution through a second column leaving an acid waste sludge remaining in said second distillation means;

collecting a substantially pure $H_2SO_4$ liquid after said substantially pure $H_2SO_4$ vapor ascends through said second column and a second mist eliminator coupled to the output of said second column and condenses in a condensing means;

generating a vacuum that reduces the operating pressure in said first distillation means and said second distillation means with a vacuum generation means coupled to said first distillation means and to said second distillation means;

reducing said particulates of said substantially pure $H_2SO_4$ vapor by adjusting said operating pressure, thus decreasing the density of said substantially pure $H_2SO_4$ vapor and decreasing the terminal velocity of said particulates, such that said particulates remains in said acid waste sludge;

generating ozone and introducing said ozone into said substantially pure $H_2SO_4$, said substantially pure $H_2SO_4$ having ozone introduced therein being used at said semiconductor processing station;

removing said acid waste sludge from said second distillation means through a second feed output into a waste collection tank.

12. The method for reprocessing waste oxidant solution as described in claim 11 wherein said vacuum generating step further includes receiving water escaping from said first distilling step into a first input of a heat exchanging means, simultaneously receiving said acid waste sludge from said second distilling step into a second input of said heat exchanging means and trickling waste acid through a third input at the top of said heat exchanging means for setting the minimum pressure in said first and second distillation means.

13. The method for reprocessing waste oxidant solution as described in claim 12 wherein said first distillation means and said second distillation means are structures comprised substantially of borosilicate glass.

14. The method for reprocessing waste oxidant solution as described in claim 11, further comprising the step of destroying any residual ozone in said waste oxidant solution received from said semiconductor processing center.

* * * * *